United States Patent Office 3,525,789
Patented Aug. 25, 1970

3,525,789
SUBSTITUTED TRIAZINONES
John Paul Chupp, Kirkwood, Mo., assignor to Monsanto Company, St. Louis, Mo., a corporation of Delaware
No Drawing. Continuation-in-part of application Ser. No. 523,924, Feb. 1, 1966. This application June 5, 1968, Ser. No. 734,554
Int. Cl. A01n 9/22; C07d 55/12
U.S. Cl. 71—93        9 Claims

ABSTRACT OF THE DISCLOSURE 1-(chloro substituted phenyl)-4,6-diisopropyl-3,5-dimethyl-hexahydro-1,3,5-triazin-2-ones which are phytotoxic.

---

This application is a continuation-in-part of application Ser. No. 523,924, filed Feb. 1, 1966, and now abandoned.

This invention relates to new and useful compounds, specifically 1-(chloro substituted phenyl)-4,6-diisopropyl-3,5-dimethyl-hexahydro-1,3,5-triazin-2-ones of the general formula

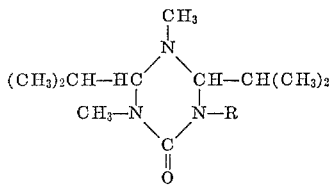

wherein R is chloro substituted phenyl selected from 3-chlorophenyl, 4-chlorophenyl and 3,4-dichlorophenyl, but particularly the latter, and to the phytotoxicidal use thereof.

These compounds are readily prepared by bringing together and reacting substantially one mole of an isocyanate of the formula R—N=C=O, wherein R has the aforedescribed significance, and substantially two moles of N-isobutylidene-N-methylimine, which is the Schiff base $(CH_3)_2CH—CH=N—CH_3$ obtained from equal moles of methylamine and isobutyraldehyde, at a temperature in the range of from about 10° C. to about 40° C. The reaction is preferably conducted in the presence of an inert organic liquid such as benzene, toluene, xylene, chlorobenzene, tetrachloroethane, carbon tetrachloride, and the like.

As illustrative of the preparation of these compounds but not limitative thereof is the following:

EXAMPLE I

To a suitable reaction vessel equipped with a thermometer and agitator is charged 8.6 parts by weight of N-isobutylidene-N-methylimine and approximately 50 parts by weight of benzene. While agitating the so charged mass 7.65 parts by weight of 4-chlorophenylisocyanate is slowly added while maintaining the temperature below about about 32° C. The reaction mass is then agitated at room temperature for about three hours, and thereafter evaporated to remove the benzene. The oily liquid residue is 1-(4 - chlorophenyl) - 4,6 - diisopropyl-3,5-dimethyl-hexahydro-1,3,5-triazin-2-one.

EXAMPLE II

Employing the procedure of Example I but replacing 4-chlorophenylisocyanate with an equimolecular amount of 3,4-dichlorophenylisocyanate there is obtained as a yellow oily viscous liquid 1-(3,4-dichlorophenyl)-4,6-diisopropyl-3,5-dimethylhexahydro-1,3,5-triazin-2-one.

EXAMPLE III

Employing the procedure of Example I but replacing 4-chlorophenylisocyanate with an equimolecular amount of 3-chlorophenylisocyanate there is obtained as a light yellow oily liquid 1-(3-chlorophenyl)-4,6-diisopropyl-3,5-dimethylhexhydro-1,3,5-triazin-2-one.

In the process of this invention the methods by which the compounds of this invention are isolated can vary in accordance with well known procedures therefor. For example, purification if such be deemed necessary, by solvent extraction or by adsorptive agents such as activated carbon can precede the removal of the inert organic solvent when the latter is employed in the reaction system. Additionally an inert organic solvent can be added to the reaction product along with the absorptive agent or agents for purification purposes. However, in general the reaction product even in the crude state is generally satisfactory for phytotoxicidal purposes without further purification.

The compounds of this invention can be alternatively termed 1-(chloro substituted phenyl)-4,6-diisopropyl-3,5-dimethyl-hexahydro-s-triazine-2(1H)-ones.

The compounds of this invention are phytotoxic to a wide variety of plant life in the pre-emergent state and in particular in the post-emergent state. These compounds are particularly effective against growing broad leaf plants. 1-(3,4-dichlorophenyl)-4,6 - diisopropyl - 3,5-dimethyl-hexahydro-1,3,5-triazin-2-one is particularly outstanding at relatively low application rates in the control of cocklebur (species of the genus Xanthium) and velvet leaf (species of the genus Abutilon) which are notorious annual weeds in growing cotton and growing corn throughout the United States. This compound, like the others of this invention, also exhibits favorable mammalian toxicity, and additionally like the others of this invention, is substantially non-water sensitive.

As illustrative of the contact or post-emergent phytotoxicity of the compounds of this invention is the following:

(A) 1-(3-chlorophenyl) - 4,6 - diisopropyl-3,5-dimethylhexahydro - 1,3,5 - triazin-2-one, 1-(4-chlorophenyl)-4,6 - diisopropyl - 3,5 - dimethyl-hexahydro-1,3,5-triazin-2-one and 1-(3,4-dichlorophenyl)-4,6 - diisopropyl-3,5-dimethyl-hexahydro-1,3,5-triazin-2-one, respectively, were applied as aqueous sprays at a concentration of 0.5 percent by weight at a rate of 10 pounds of active ingredient per acre to separate plots each having 14 day established growth of morning glory, wild oat, brome grass, rye grass, radish, sugar beet, foxtail, crab grass, pigweed, soybean, wild buckwheat, and tomato. An inspection of the plots conducted fourteen days after the respective applications revealed all plants to be dead;

(B) 1-(3,4 - dichlorophenyl) - 4,6 - diisopropyl-3,5-dimethyl-hexahydro-1,3,5-triazin-2-one was applied as an aqueous spray at a concentration of 0.2 percent by weight at a rate of 4 pounds of active ingredient per acre to separate plots both having 14 day established growths of morning glory, radish, sugar beet, pigweed, soybean, wild buckwheat, and tomato. An inspection of the respective plots conducted fourteen days after the application revealed that all of these seven broad leaf plants were dead. Employing this same procedure but using, respectively, 1-(3,4 - dichlorophenyl)-3,5-diethyl-hexahydro-1,3,5-triazin-2-one, a brown viscous oil, and 1-(3,4-dichlorophenyl)-4,6-diisopropyl-3,5-diethyl-hexahydro-1,3,5-triazin-2-one, a white solid melting at 110–113° C., to obtain the same phytotoxic results on separate plots each having 21 day established growths of the said seven broad leaf plants it was necessary to apply each one of these two compounds as an aqueous spray at a concentration of 0.2 percent by weight at a rate of at least 10 pounds per acre;

(C) 1-(4 - chlorophenyl) - 4,6 - diisopropyl-3,5-dimethyl-hexahydro-1,3,5-triazin-2-one was applied as an aqueous spray at a concentration of 0.2 percent by weight at a rate of 4 pounds of active ingredient per acre to separate plots both having 14 day established growths of morning glory, radish, sugar beet, pigweed, soybean, wild buckwheat, and tomato. An inspection of the respective plots conducted fourteen days after the application revealed that all of these seven broad leaf plants were dead. Employing this same procedure but using, respectively, 1-(4-chlorophenyl) - 3,5 - diethyl-hexahydro-1,3,5-triazin-2-one, a brown oil, 1-(4-chlorophenyl)-3,5-dimethyl-hexahydro-1,3,5-triazin-2-one, a brown oil, and 1-(4-chlorophenyl)-3,5-dimethyl-hexahydro-1,3,5-triazin - 2 - one, a brown oil, and 1-(4-chlorophenyl)-4,6-diisopropyl-3,5-diethyl-hexahydro-1,3,5-triazin-2-one, a yellow wax, to obtain the same phytotoxic results on separate plots each having 21 day established growths of the said seven broad leaf plants is was necessary to apply each one of these three compounds as an aqueous spray at a concentration of 0.2 percent by weight at a rate of more than 10 pounds per acre.

As illustrative of the pre-emergent phytotoxicity of the preferred compound of this invention is the following:

(D) 1 - (3,4 - dichlorophenyl) - 4,6 diisopropyl-3,5-dimethyl - hexahydro - 1,3,5 - triazin - 2 - one was incorporated in a good grade of top soil at a rate of 5 pounds of active agent per acre and thereafter separate plots thereof were seeded with a wide variety of grasses and broad leaf plants. Fourteen days latter in the greenhouse under ordinary conditions of sunlight and watering, this compound of this invention displayed very pronounced to complete suppression of the pre-emergent growth of morning glory, wild oat, radish, sugar beet, barnyard grass, crab grass, pigweed, wild buckwheat, soybean, tomato and sorghum, but did not effect the pre-emergent growth of cotton or corn.

As aforementioned 1-(3,4-dichlorophenyl) - 4,6-diisopropyl - 3,5 - dimethyl - hexahydro - 1,3,5 - triazin - 2-one of this invention is particularly outstanding at relatively low application rates in the control of cocklebur (species of the genus Xanthium) and velvet leaf (species of the genus Abutilon) which are notorious annual weeds in growing cotton and growing corn throughout the United States. The water requirement of these respective annual weeds is so great that they are rough competitors for water in growing corn and growing cotton which element of water competitiveness when they are present significantly reduces the respective crop yields. To illustrate such 1-(3,4-dichlorophenyl) - 4,6 - diisopropyl - 3,5 - dimethyl-hexahydro - 1,3,5 - triazin - 2 - one, 1-(3,4 - dichlorophenyl)-4,6-diisopropyl - 3,5 - diethyl - 1,3,5 - triazin-2-one, and 1-(3,4-dichlorophenyl) - 3,5 - dimethyl-hexahydro - 1,3,5 - triazin - 2 - one, a brown oil, respectively, were applied as aqueous sprays at a concentration of 0.05 percent by weight at a rate of one (1) pound of active ingredient per acre to separate plots each having 21 day established growth of corn (Zea mays), cocklebur (Xanthium pensylvanicum) and velvet leaf (Abutilon theophrasti). An inspection of the plots conducted fourteen days after the application revealed the following tabulated results wherein the relative value of each compound with respect to its phytocidal effect on the various growing plants is indicated by a number as follows:

0 _____ No phytotoxicity.
1 _____ Slight phytotoxicity.
2 _____ Moderate phytotoxicity.
3 _____ Severe phytotoxicity.

| Compound/Plant | Corn | Cocklebur | Velvet Leaf |
|---|---|---|---|
| 1-(3,4-dichlorophenyl)-4,6-diisopropyl-3,5-dimethyl-hexahydro-1,3,5-triazin-2-one | 0 | 3 | 3 |
| 1-(3,4-dichlorophenyl)-4,6-diisopropyl-3,5-diethyl-hexahydro-1,3,5-triazin-2-one | 0 | 0 | 0 |
| 1-(3,4-dichlorophenyl)-3,5-dimethyl-hexahydro-1,3,5-triazin-2-one | 0 | 1 | 1 |
| Control* | 0 | 0 | 0 |

*No active ingredient

1 - (4 - chlorophenyl) - 4,6 - diisopropyl - 3,5-dimethyl-hexahydro - 1,3,5 - triazin - 2 - one is also active against these immediately aforesaid species of noxious vegetation. To illustrate such 1-(4-chlorophenyl) - 4,6 - diisopropyl-3,5 - diethyl - hexahydro - 1,3,5 - triazin - 2 - one and the aforesaid compound of this invention were applied as aqueous sprays at a concentration of 0.05 percent by weight at a rate of one (1) pound of active ingredient per acre to separate plots both having 21 days established growth of corn (Zea mays), cocklebur (Xanthium pensylvanicum) and velvet leaf (Abutilon theophrasti). An inspection of the plots conducted fourteen days after the application revealed the following tabulated results wherein the relative value of each compound with respect to its phytocidal effect on the various growing plants is indicated by a number as follows:

0 _____ No phytotoxicity.
1 _____ Slight phytotoxicity.
2 _____ Moderate phytotoxicity.
3 _____ Severe phytotoxicity.

| Compound/Plant | Corn | Cocklebur | Velvet Leaf |
|---|---|---|---|
| 1-(4-chlorophenyl)-4,6-diisopropyl-3,5-dimethyl-hexahydro-1,3,5-triazin-2-one | 0 | 2 | 2 |
| 1-(4-chlorophenyl)-4,6-diisoproply-3,5-diethyl-hexahydro-1,3,5-triazin-2-one | 0 | 0 | 0 |
| Control* | 0 | 0 | 0 |

*No active ingredient.

From the foregoing evaluation data it is apparent that the compounds of this invention are effective phytotoxicides particularly as post-emergent or contact phytotoxicides. Valuable selective post-emergent phytotoxicidal effects will be observed by applications of small amounts, for example, as low as 0.1 lb. of a compound of this invention per acre as well as higher concentrations, for example, up to 15 lbs. per acre. The preferred range of application for post-emergent specificity in growing cotton or corn is from about 1 to about 10 lbs. per acre. For general application and phytotoxicidal effect on both grasses and broad leaf plants in either the pre-emergent or post-emergent larger amounts, e.g. from about 15 to about 30 lbs. per acre, will be found necessary.

It will be apparent that quite different effects can be obtained by modifying the method of use. For this reason an essential part of this invention is the formulation so as to permit a uniform predetermined application of phytotoxicide to growing plants or soil or other growth media so as to produce the desired effect. By proper selection and proportioning of the various conditioning agents either liquid or solid formulations can be prepared, and so as to adapt the phytotoxicide for achieving the desired result with any conventional device for treating growing plants or the surface or sub-surface of the soil or other growth media.

Although the compounds of this invention are useful per se in controlling a wide variety of plant growth in the pre-emergent or post-emergent state, it is preferable that they be supplied to the plant growing medium or growing plant in a dispersed form in a suitable extending agent.

In the instant specification and appended claims it is to be understood that the term "dispersed" is used in its widest possible sense. When it is said that the compounds of this invention are dispersed, it means that the particles of the compounds of this invention may be molecular in size and held in true solution in a suitable organic solvent. It means further that the particles may be colloidal in size and held in true solution in a suitable organic solvent. It means further that the particles may be colloidal in size and distributed throughout a liquid phase in the form of suspensions or emulsions or in the form of particles held in suspension by a wetting agent. The term "dispersed" also means that the particles can be mixed with and distributed throughout a solid carrier providing a mixture in particulate form, e.g. pellets, granules, powders, or dusts.

In the instant specification and appended claims it is to be understood that the expression "extending agent" includes any and all of those substances in which the compounds of this invention are dispersed. It includes therefore, the solvents of a true solution, the liquid phase of suspensions, or emulsions and the solid phase of particulate solids, e.g., pellets, granules, dusts and powders.

The exact concentration of the compounds of this invention employed in combatting or controlling noxious vegetation can vary considerably provided the required dosage (i.e. phytotoxic amount) thereof is supplied to the growing plant or plant growing medium. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared phytotoxicidal spray or particulate solid. In such a concentrate composition, a compound of this invention generally will be present in a concentration of 5 to 95 percent by weight, the residue being any one or more of the well-known phytotoxicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and the like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The compounds of this invention are preferably applied to growing plants or the plant growing medium in the form of emulsions or suspensions. Emulsions or suspensions are prepared by dispersing a compound of this invention either per se or in the form of an organic solution thereof in water with the aid of a water-soluble surfactant. The term "surfactant" as employed here in the appended claims is used as in Volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," Second edition, 1948, page 280). These surfactants include the well-known capillary active substances which may be anion-active (or anionic), cation-active (or cationic), or non-ionizing (or non-ionic) which are described in detail in Volume I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants, i.e. the anion-active, cationic-active and non-ionizing capillary active substances are incorporated in this specification by reference in order to avoid unnecessary enlargement of this specification. The preferred surfactants are the water-soluble non-ionic surface-active agents set forth in U.S. 2,846,398 (issued Aug. 5, 1958).

The compounds of this invention can be dispersed by suitable methods (e.g. tumbling or grinding) in solid extending agents either of organic or inorganic nature and applied to growing plants or plant growing medium in particulate form. Such solid materials include for example, tricalcium phosphate, calcium carbonate, kaoline, bole, kieselguhr, talc, bentonite, fuller's earth, pyrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. Attapulgus clay. These mixtures can be used for phytotoxicidal purposes in the dry form or by addition of water-soluble surfactants or wetting agents the dry particulate solids can be rendered wettable by water so as to obtain aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of a compound of this invention with a water-soluble surfactant which lowers the surface tension of water in the weight proportions of 0.1 to 15 parts of said surfactant with sufficient of a compound of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of 1-(3,4-dichlorophenyl)-4,6-diisopropyl-3,5-dimethyl-hexahydro-1,3,5-triazin-2-one and 5 parts by weight of a water-soluble non-ionic surfactant such as polyoxyethylene derivative of sorbitan monolaurate.

Another useful concentrate adapted to be made into a spray for combatting noxious vegetation is a solution (preferably as concentrated as possible) of a compound of this invention in an organic solvent therefor. The said liquid concentrate preferably contains dissolved therein a minor amount (e.g. 0.5 to 10 percent by weight of the weight of the new phytotoxicidal agent) of a non-ionic surfactant (or emulsifying agent), which non-ionic surfactant is water-soluble. As illustrative of such a concentrate is a solution of 1-(3,4-dichlorophenyl)-4,6-diisopropyl-3,5-dimethyl-hexahydro-triazin-2-one in acetone which solution contains dissolved therein a water-soluble polyoxyethylene non-ionic surfactant.

Of the surfactants aforementioned in preparing the various emulsifiable, wettable or dispersible compositions or concentrates of this invention, the non-ionic surfactants are preferred. Of the non-ionic surfactants, the particularly preferred are the water-soluble polyoxyethylene derivatives of alkylphenols (particularly isooctylphenol)

and the water-soluble polyoxyethylene derivatives of the mono-higher fatty acid esters of sorbitan respectively containing 15 to 30 moles of ethylene oxide per mole of sorbitan mono-ester or alkylphenol.

In all of the various dispersions described hereinbefore for phytotoxicidal purposes, the active ingredient can be one or more of the compounds of this invention. The compounds of this invention can also be advantageously employed in combination with other pesticides, including for example, fungicides, nematocides, bactericides and insecticides. In this manner it is possible to obtain mixtures which are effective against a wide variety of pests and other forms of noxious life.

1-(3,4-dichlorophenyl)-3,5-dimethyl-hexahydro - 1,3,5-triazin-2-one described hereinbefore for comparative purposes is described and prepared as disclosed in Belgium Pat. 627,746 from approximately 2 moles of formaldehyde, approximately 1 mole of methylamine and approximately 1 mole of N-(3,4-dichlorophenyl)-N'-methyl urea. Using this same procedure (a) but replacing methylamine with an equimolecular amount of ethylamine and replacing N-(3,4-dichlorophenyl)-N'-methylurea with an equimolecular amount of N-(3,4-dichlorophenyl)-N'-ethylurea there is obtained 1-3,4 - dichlorophenyl)-3,5-diethyl-hexahydro-1,3,5-triazin-2-one;

(b) but replacing methylamine with an equimolecular amount of ethylamine and replacing N-(3,4-dichlorophenyl)-N')methylurea with an equimolecular amount of N-(4-chlorophenyl)-N'-ethylurea there is obtained 1-(4-chlorophenyl) - 3,5 - diethyl - hexahydro-1,3,5-triazin-2-one;

(c) but replacing N-(3,4-dichlorophenyl) - N'-methylurea with an equimolecular amount of N-4-chlorophenyl)-N'-methylurea there is obtained 1-(4-chlorophenyl)-3,5-dimethyl-hexahydro-1,3,5-triazin-2-one;

which three compounds, i.e. those of (a), (b) and (c) immediately above, are described hereinbefore for comparative purposes. 1-(3,4-dichlorophenyl)-4,6-diisopropyl-3,5-diethyl-hexahydro-1,3,5-triazin-2-one and 1-(4-chlorophenyl) - 4,6 - dissopropyl-3,5-diethyl-hexahydro-1,3,5-triazin-2-one, respectively, described hereinbefore for comparative purposes, are respectively prepared in accordance with the procedure of respective Examples II and I set forth hereinbefore but each instance replacing N-isobutylidene-N-methylimine with an equimolecular amount of N-isobutylidene-N-ethylimine, the Schiff base obtained from equal moles of the ethylamine and isobutyraldehyde.

The embodiments of the invention in which an exclusive property or privilege is claimed are defined as follows:

1. A method for controlling growing noxious plant life which comprises applying thereto a phytotoxic amount of a 1-(chloro substituted phenyl)-4,6-diisopropyl-3,5-dimethyl-hexahydro-1,3,5-triazin-2-one of the formula

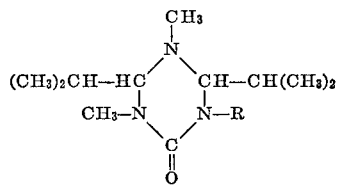

wherein R is selected from the group consisting of 3-chlorophenyl, 4-chlorophenyl and 3,4-dichlorophenyl.

2. A method in accordance with claim 1 for controlling broadleaf weed infestations which comprises applying at a rate of 0.1 up to 15 pounds per acre the 1,3,5-triazin-2-one of the formula set forth in said claim 1 wherein R is 3,4-dichlorophenyl to the growing weeds.

3. A method in accordance with claim 2 for controlling broadleaf weed infestations in growing cotton which comprises applying thereto at a rate of from about 1 to about 10 pounds of the recited 1,3,5-triazin-2-one of said claim 2 per acre.

4. A method in accordance with claim 2 for controlling broadleaf weed infestations in growing corn which comprises applying thereto at a rate of from about 1 to about 10 pounds of the recited 1,3,5-triazin-2-one of said claim 2 per acre.

5. A method of pre-emergently inhibiting the growth of plants which comprises treating the plant growing medium with a quantity sufficient to inhibit the pre-emergent growth of plants contained in the plant growing medium of a 1-(chloro substituted phenyl)-4,6-diisopropyl-3,5-dimethyl-hexahydro-1,3,5-triazin-2-one of the formula

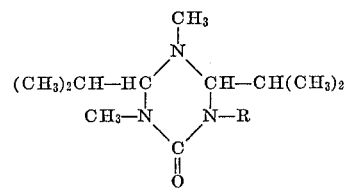

wherein R is selected from the group consisting of 3-chlorophenyl, 4-chlorophenyl and 3,4-dichlorophenyl.

6. A method for controlling broadleaf weed infestations in growing cotton wherein the weed infestations comprise a weed of the group consisting of cocklebur species of the genus Xanthium and velvet leaf species of the genus Abutilon which comprises applying to the growing weeds 1-(3,4-dichlorophenyl) - 4,6 - diisopropyl-3,5-dimethyl-hexahydro-1,3,5-triazin-2-one at a rate of from about 1 to about 10 pounds per acre.

7. A method for controlling broadleaf weed infestations in growing corn wherein the weed infestations comprise a weed of the group consisting of cocklebur species of the genus Xanthium and velvet leaf species of the genus Abutilon which comprises applying to the growing weeds 1-(3,4-dichlorophenyl) - 4,6 - diisopropyl-3,5-dimethyl-hexahydro-1,3,5-triazin-2-one at a rate of from about 1 to about 10 pounds per acre.

8. A phytocidal concentrate comprising on a weight basis 0.1 to 15 parts of a non-ionic water-soluble surfactant and sufficient 1-(3,4-dichlorophenyl)-4,6-diisopropyl-3,5-dimethyl-hexahydro-1,3,5-triazin-2-one to make 100 parts by weight.

9. A phytocidal concentrate comprising 1-(3,4-dichlorophenyl)-4,6-diisopropyl-3,5-dimethyl - hexahydro-1,3,5-triazin-2-one dispersed in an inert organic solvent therefor and having dissolved therein a non-ionic water-soluble surfactant in the weight proportion of 0.5 to 10 percent based on the weight of the said 1,3,5-triazin-2-one.

References Cited

FOREIGN PATENTS 966,283 8/1964 Great Britain.

LEWIS GOTTS, Primary Examiner

M. M. KASSENOFF, Assistant Examiner

U.S. Cl. X.R.

260—248